(12) United States Patent
Miller

(10) Patent No.: US 7,526,898 B2
(45) Date of Patent: May 5, 2009

(54) MARKETING, DESIGN, AND CONSTRUCTION TECHNIQUES FOR BUILDINGS

(75) Inventor: Jonathan T. Miller, Shorewood, MN (US)

(73) Assignee: Dimension Development, Inc., Shorewood, MN (US)

( * ) Notice: Subject to any disclaimer, the term of this patent is extended or adjusted under 35 U.S.C. 154(b) by 533 days.

(21) Appl. No.: 10/668,637

(22) Filed: Sep. 22, 2003

(65) Prior Publication Data

US 2004/0074173 A1    Apr. 22, 2004

Related U.S. Application Data

(60) Provisional application No. 60/412,606, filed on Sep. 20, 2002.

(51) Int. Cl.
| | |
|---|---|
| *E04H 1/00* | (2006.01) |
| *E04H 14/00* | (2006.01) |
| *E04H 3/00* | (2006.01) |
| *E04H 5/00* | (2006.01) |
| *E04H 6/00* | (2006.01) |

(52) U.S. Cl. ............................. 52/234; 52/200; 52/79.2
(58) Field of Classification Search ................. 52/234, 52/200, 169.3, 169.2, 175, 79.1, 79.2
See application file for complete search history.

(56) References Cited

U.S. PATENT DOCUMENTS

| | | | | |
|---|---|---|---|---|
| 1,512,975 A | * | 10/1924 | Bright | 52/8 |
| 2,156,859 A | * | 5/1939 | Lowe | 52/106 |
| 2,763,381 A | * | 9/1956 | Bowles | 414/256 |
| 3,290,837 A | * | 12/1966 | Weston | 52/30 |
| 3,824,752 A | * | 7/1974 | Weston | 52/176 |
| 4,608,785 A | * | 9/1986 | Rhodes et al. | 52/2.17 |
| 4,685,260 A | | 8/1987 | Jenn | 52/169.3 |
| 4,696,133 A | * | 9/1987 | Wren et al. | 52/81.6 |
| 4,761,716 A | * | 8/1988 | Mori | 362/576 |
| 4,800,692 A | | 1/1989 | Jenn | 52/169.2 |
| 5,469,673 A | * | 11/1995 | Raynor et al. | 52/79.7 |
| 6,182,408 B1 | * | 2/2001 | Poehler | 52/234 |
| 6,209,270 B1 | | 4/2001 | Johnston | 52/175 |

OTHER PUBLICATIONS

"WindSong CoHousing Community", www.windsong.bc.ca/id63.htm, Sep. 1, 2005 (1 pg.).
"WindSong CoHousing Community", www.windsong.bc.ca/id30_m.htm, Sep. 1, 2005 (1 pg.).

* cited by examiner

*Primary Examiner*—Richard E Chilcot, Jr.
*Assistant Examiner*—Chi Q Nguyen
(74) *Attorney, Agent, or Firm*—Brooks Cameron & Huebsch PLLC

(57) ABSTRACT

Embodiments of the present invention relate to methods and systems for marketing, designing, and constructing buildings. One system embodiment includes a system for gaining approval for a building project. The system includes building prototype information and a building approval program. The building prototype information can include design and architectural information. The building approval program can provide editable document templates for submission to a project approval process.

18 Claims, 8 Drawing Sheets
(2 of 8 Drawing Sheet(s) Filed in Color)

MARKETING, DESIGN, AND CONSTRUCTION TECHNIQUES FOR BUILDINGS

This application claims the benefit of U.S. Provisional Application No. 60/412,606, filed Sep. 20, 2002.

FIELD OF THE INVENTION

Embodiments of the present invention relate to methods, devices, and systems for marketing, designing, and constructing buildings.

BACKGROUND OF THE INVENTION

In the field of construction, when a building is proposed and a potential site selected, the design of the building typically has to be reviewed and approved by a number of parties. For example, parties where approval may need to be obtained include a municipality in which the structure is to be built and a financing source for the construction of the building, and the like. Since these parties can influence whether a project can be developed and can influence many aspects of the project, based on zoning codes and other ordinances, being prepared and having a detailed presentation before these parties can be important.

Typically, since the preparation of exterior and interior views, floor and unit plans, detailed construction plans, material takeoffs, and the like, are expensive, developers prefer to incur those costs after the project has been approved. Accordingly, developers typically do not have a prototype design and specifications prepared to present to the parties and therefore, the parties can have difficulty understanding what the building will be like and how it will impact the community and land on which it will be constructed.

Additionally, oftentimes with respect to a multi-unit building project, a financing source will want a number of units be pre-sold to assure the financing source that the project will likely be successful and that their investment will be repaid. In many cases, in order to pre-sell units, many developers will build a full scale model unit and invite potential unit buyers into the model to visualize what the units will look like. This is an extremely expensive method and, in a multi-unit building, typically requires the construction of more than just a single unit as well as having at least municipal approval for the project.

Developers are typically skilled in the development of a site and building, but may not be as skilled in presenting to and navigating the approval process or in marketing the units to buyers. For example, a develop may be experienced with the local approval process for a particular geographical area, but when they decide to build in another area, may not know the details of the approval process for that location. In such cases, an approval process through a municipality or other approval board can be difficult to navigate efficiently and can, for example, delay construction, alter the design of the building through municipality recommendations, or end up with the project not being approved after significant time and expenditures may have been made.

Additionally, people generally enjoy the amenities offered by single-family homes, such as yard areas, porches, and the like. Because of the lack of available land within a convenient travel distance from many urban areas, single-family homes are increasingly being replaced by multi-family housing. Another feature of our society which has become less common is that of an attitude of "neighborliness" in higher density housing, such as in an urban setting.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Embodiments of the present invention relate to methods, devices, and systems for marketing, designing, and constructing buildings. Embodiments of the invention include software programs for aiding in the sale, marketing, and/or approval of a building project and/or of individual units within a multi-unit building.

Embodiments include multi-unit residential building concepts where the structures include individual units positioned in a configuration surrounding an atrium structure, with each unit having free and open access to the adjacent atrium are also provided. Embodiments, however, are not limited to residential structures and can include commercial building uses and combinations thereof. Embodiments for unit arrangement can create a suburban ambiance in a downtown or highly urbanized area. Additionally, embodiments of the invention can be focused to satisfy the housing needs of various groups of people. Embodiments can accommodate various groups of people, for example, in different lifestyles stages or lifestyle conditions, such as families with growing children, mature adults, and the physically challenged.

Embodiments of the present invention offer individuals and families an opportunity to readily establish relationships and roots which will foster an interactive and safe environment so that the individuals and family members can more fully enjoy a dynamic lifestyle. Multi-family housing facilities can support retail and commercial services, as well as community amenities to provide an overall planned community design so as to add further features which can create a higher degree of vitality to the housing and its immediate environs. Embodiments focusing on a medium to high density housing option, preserving the neighborliness of traditional single-family homes and neighborhoods are provided. This arrangement is suitable for new developments or as an effective redevelopment tool.

Figure 1:
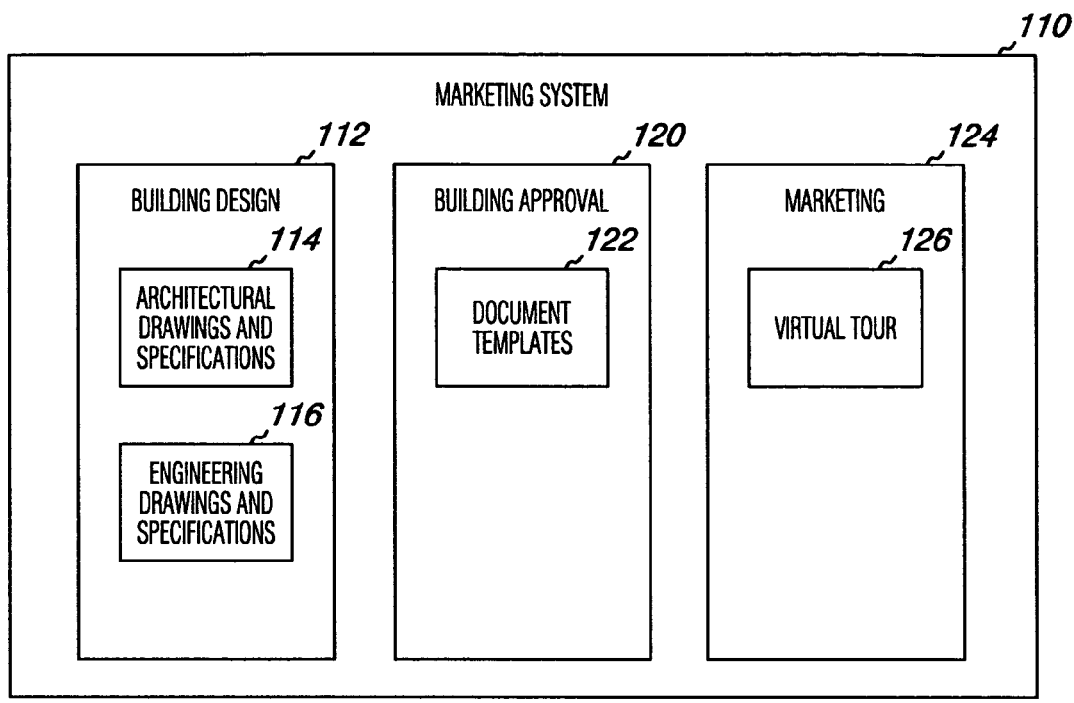
FIG. 1 illustrates a marketing system embodiment.

FIG. 1 illustrates a building prototype marketing system embodiment. The system 110 can be presented in a variety of formats, such as in an independent computing device, in a network, or on a memory storage medium/device, among others.

For example, the marketing system 110 can be provided in the memory of a computer device and can be accessed by users of the device through use of input/output components such as a display, keyboard, mouse, touch screen, and the like. The marketing system 110 can also be provided in the memory of a server device and can be accessed by users of one or more remote devices such as computer devices. For example, the system 110 can be in the form of a site, such as a website, that can be accessed via a network, such as via the Internet, and the like. One such embodiment is described in detail below with respect to FIG. 3, however, the invention is not limited to such an embodiment.

The marketing system 110 can also be provided in a computer readable medium, such as a video tape (i.e. VHS, Beta, etc.), compact disk, DVD, floppy disk, or flash memory device, among others. Portable embodiments such as the use of a portable memory device or an electronic version of the marketing system 110 can be sent to prospective developers, buyers, or lessees of a building, buyers, renters, or lessees of individual units, or parties of an approval process, among others. In some embodiments of the marketing system 110 that can be sent to such parties, the system 110 can be designed specifically for the party that it is to be sent. In this way, the information the party receives can include the particular information for a phase of the building project that they are in, such as the approval process, the marketing process, or the construction process, or can include information particular to their particular building project, such as local building codes, forms for a particular approval process, and the like.

The marketing system 110 can be used in a variety of ways. For example, the system 110 can be used as a marketing tool to inform buyers about the building project and/or the units of the building. The system 110 can also be used to collect information from prospective buyers for determining the feasibility of the building project in a particular market. For example, the marketing system 110 can record selections made by users of the system 110 to determine a general interest in the project, or what a number of users would like the building and/or units to include. This information can be obtained from the general public or can be targeted to particular groups such as retired persons, people with physical handicaps, people in a particular geographic area, or other such groups.

For example, the marketing system 110 can be presented in the form of a website having a link to the website of the American Association of Retired Persons (AARP). The visitors of AARP site can fill out a survey or make selections while viewing images of the building prototype and the information from the survey and/or selections can be used to determine a variety of information about the potential buyers of the individual units of a building. Information can include dimensions of units and/or the building, features of the units and/or building, geographical location of potential buyers, price range for units, and the like. This information can then be used to decide where to build a building, where to approach developers to buy the building project, marketing of the project to developers, and statistical information for use in a financial approval process, among other purposes.

The system 110 can include one or more software or firmware program components such as a building design program 112, a building approval program 120, and a marketing program 124. Each of these components can be independent of the other components and can be used separately or in combination with one another.

The system 110 can include an access mechanism, such as a password, to allow access to the different components of the system 110. In this way, as the user of the system 110 moves from one phase of the building project to the next, additional access fees can be obtained before access is granted. The access mechanism can be provided by software or firmware, among others. For example, the user can pay a fee to use the building design program 112, but be restricted from use of the building approval program 120 and the marketing program 124, until a fee is paid for use of one or more of the restricted programs.

In the embodiment of FIG. 1, a building design program 112 can provide information to prospective buyers of the building design and/or can provide information to potential purchasers of individual units of the building. The drawings and specifications of the building design program can also be useful for arranging financing for the project. For example, the drawings and specifications can be shown to a financing source to illustrate what the building will look like and potential options that can be implemented into the design. This information may encourage a financial source to invest in the building project because the building can be visualized.

Additionally, since many financial sources require a number of units of a multi-unit building to be pre-sold, the drawings and specifications can be presented to potential buyers of individual units to aid them in determining whether to purchase a unit. The information can also be used in site and building approval, such as from a municipality, and in marketing of the project to determine feasibility, as well as for other processes regarding the marketing, design, and construction of the building.

As stated above, the marketing system 110 can include a building design program 112. The building design program 112 can include a variety of information, from general views of the interior and/or exterior of the building, to detailed construction specifications and drawings that would be necessary for the actual construction of the building. The information include: text, pictures, videos, drawings, and two and/or three dimensional renderings, among others. The pictures and videos can, for example, show related, similar projects or a prototype that has been constructed, people discussing the project and its features, and/or features from other buildings that can be incorporated into a building project, among others.

For example, the building design program can include design information such as perspective views of the building interior and exterior, interior views of the units, lists of optional features that can be added to the building or units, views of optional features, and views of the building and/or units with the optional features installed, among other information. These drawings and specifications can be useful for the marketing and approval of the building project, but may not be necessary in the construction of the project. Accordingly, in some embodiments, the design information can be provided independently or prior to the approval and/or marketing phase of the building project to aid in the success of the project without having to provide all of the detail of architectural drawings and specifications that would typically be necessary for actually constructing the building.

In some embodiments, the building design program 112 can include the architectural information, such as architectural drawings and specifications 114 and engineering drawings and specifications 116, that are typically necessary for the construction of a building. For example, architectural drawings and specifications 114 can include design plans such as interior and exterior views of the units and/or building, and floor plans, among others. Engineering drawings and specifications 116 can include such information as site layout, building positioning on site, site preparation plans, plumbing, heating, air conditioning, electrical, fire retarding, and structural plans, among others. These drawings are typically necessary for the actual construction of the building, but may not be necessary for the marketing and approval of the building.

Accordingly, in some embodiments, the building design program 112 can be provided independently. In this way, the building design program 112 can be configured to address the construction phase of the building project, for example, if the marketing and/or approval phases of the project have been accomplished. Additionally, in some embodiments the design and architectural information can both be provided either at the same time or separately.

The building design program 112 can provide for selection of various design or architectural schemes, such as Victorian, Kansas, Southwest, Colonial, Oriental Garden, or the like, so as to provide identity and individuality. Open atriums are also capable of being designed in the form of a play area for youngsters residing within the multiple unit arrangement. Atriums may also feature, plantings, fountains, or in certain cases, an aviary. However, the embodiments of the invention are not so limited.

The building approval program 120 of the marketing system 110 can provide information that can help to navigate an approval process. For example, the building approval program 120 can be designed to aid in various types of approval processes, can be designed for a specific type of approval process, e.g. approval by a particular municipality, and/or can be designed for an approval process particular to a specific building project, e.g. The Market Street Condominium Project financing and/or municipality approvals.

The building approval program 120 can include document templates 122 that can be used to obtain approval of the building project from a number of parties such as from municipalities and financial sources. The document templates can be of any type, including but not limited to, forms, drawings, check lists, and other documents that are necessary for gaining project approval. The document templates 122 can be editable and can be edited manually or automatically. For example, the templates can be filled in automatically by merging data from one or more computer resources, such as databases, programs, and the like, or can be filled in automatically based on selections made through use of other parts of the marketing system or in filling out other parts of a template.

In various embodiments, the documents can be edited through use of information within the building approval program 120 or within other programs such as the building design program 112. For example, the building design program 112 can include information such as project title, building address, building dimensions, style of building, building costs, drawings, and the like. However, the embodiments of the invention are not so limited. If a template within the building approval program 120 needs one or more of these items to complete its form or set of forms, the building approval program can use the information of the building approval program 120. The building approval program 120 can also use resources on remote devices or servers to obtain information for filling out templates.

The document templates can also be organized in any manner, such as by type of approval process, timing during the project, alphabetically, and the like. For example, for approval from a financial source, the financial source will likely have particular forms having a number of fields that are to be filled in. These forms can be provided with the building approval program 120 and can be filled in automatically and/or manually. The information that is to be used to fill in the fields can be provided in one or more of the programs 112, 120, and/or 124 or can be provided from some other source such as from other programs on the device or a remote device; on a memory device; can be input by a user of a remote device using a display, keyboard, touch screen, or other user interface mechanism; or input by the user; among others. The building approval program 120 can include one or more check lists that can aid the user in preparing the information necessary to fill out the document or in compiling the documentation necessary for fulfilling the approval process.

Additionally, in some financial approval processes, a site plan and construction drawings and specifications may need to be provided. The construction drawings and specifications can be provided from any source, such as from the building design program 112.

A marketing program 124 can be included in the marketing system 110 to aid in the approval and marketing phases of the construction process. The marketing program 124 can, for example, include a virtual tour 126. The virtual tour 126 can have a number of two and/or three dimensional views of the building, information about the building project, and/or other information.

For example, a virtual tour 126 can include a number of exterior and/or interior views of the building and/or individual units. The virtual tour 126 can also include images of floor plans and schematics of the building and/or units. The virtual tour 126 can include information about the project that would be useful in marketing or gaining approval of the project, such as the number of units, pricing, lists of options, etc. The views and other information can be provided with the marketing program 124 or accessed from the building design program 112, and/or from other sources.

The virtual tour 126 can include a walkthrough feature that can show the unit and/or building in a way that seems like the viewer is walking through the unit and/or building. The virtual tour 126 can, for example, provide a virtual walkthrough of a building prototype. The virtual tour 126, for example, through the virtual walkthrough, can illustrate the building prototype in various stages of construction, such as before the drywall is applied, before the plumbing is installed, and the like. This can enable building developers, among others, to suggest modifications to features within the building before the building is actually being built. The virtual walkthrough can be designed to allow the user to make and view modifications during the walkthrough.

The virtual tour 126 can include an interactive virtual tour that can allow a user to modify the views of the prototype or to choose options based upon the views of the prototype. For example, in some embodiments the interactive virtual tour 126 can be capable of allowing a user to view the information and make selections based upon the information in the tour. The selections can be made before, during, or after the tour has concluded.

In some embodiments, the interactive tour 126 can be modified such that, when selections are made by a user, the images or copies of the images are modified to reflect the selections. For example, when viewing the exterior of the building, the user wants to change the style of the exterior or the configuration of units, the user can make selections as to what items on the building are to be modified and the virtual tour 126 will provide images showing those modifications incorporated into the design. This can be accomplished for example, having a number of original prototype images stored in memory, e.g., within a storage device, remote device, or device having the marketing system thereon. The original images can be copied and the copies modified, the original images can be modified, a number of images including such modifications within the set of images can be stored in memory and then called up when a change is selected by a user.

The interactive virtual tour 126 can be capable of saving changes selected by a user. In this way, preferences of the user can be recalled later or can be used by the marketing system 110. For example, the marketing system 110 can use the selections to determine the number of potential buyers for a particular style of building or unit and particular audience preferences, the cost of options or building materials to be purchased, the potential price for units, and the like. The marketing program 124 can include a user profile having information about the user. For example, the user profile can include the name of the user, their current address, and the like.

Figure 2:
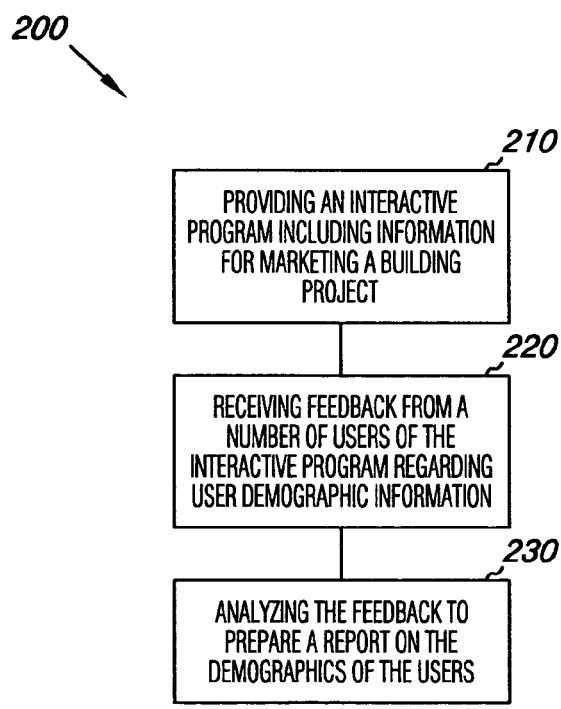
FIG. 2 illustrates a method embodiment for marketing a construction plan.

FIG. 2 illustrates a method embodiment for marketing a construction plan. Unless explicitly stated, the method embodiments described herein are not constrained to a particular order or sequence. Additionally, some of the described method embodiments and elements thereof can occur or be performed at the same point in time. Method embodiments can be performed by computer executable instructions on software and/or firmware.

The embodiment of FIG. 2 illustrates a method for marketing a building project. The method includes providing an interactive program including information for marketing a building project at block 210. The method also includes receiving feedback from a number of users of the interactive program regarding user demographic information at block 220. The method can also include receiving feedback from a user including at least one building feature preference from each user. The at least one building feature can, for example, include one or more geographical locations, building features/options such as the style of building, unit features/options, among others. The feedback from the number of users can for example, include at least each user's age, name, price range or target price, address, number and ages of children, special disabilities, and other such demographic information. The method also includes analyzing the feedback to prepare a report on the demographics of the users at block 230.

Figure 3:
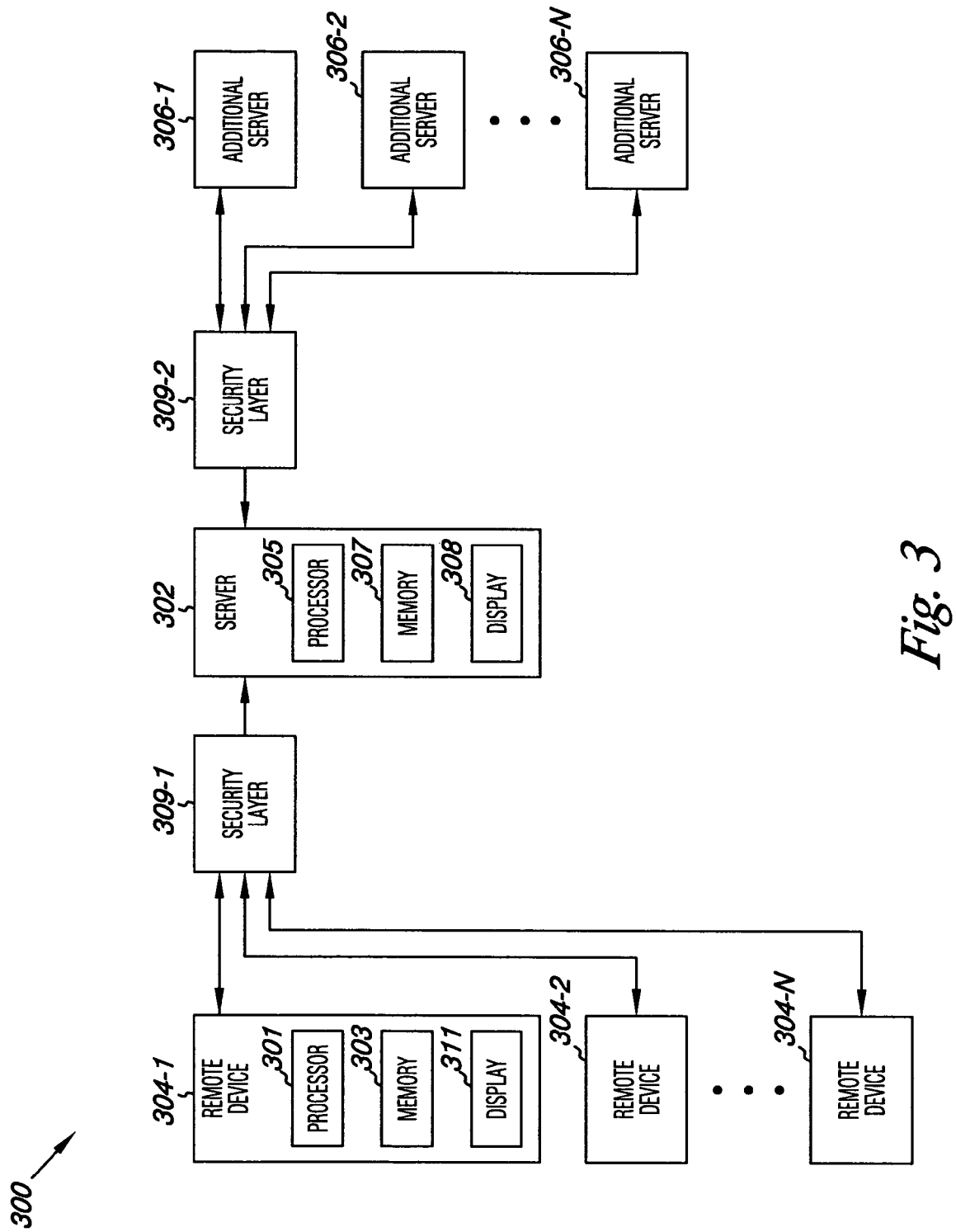
FIG. 3 illustrates a system embodiment for marketing a construction plan.

FIG. 3 is an illustration of a system 300 according to the teachings of the present invention. In one embodiment, the system 300 includes an Internet network system 300. In FIG. 3, the system 300 can include a server 302. Server 302 can include a processor 305 coupled to a memory 307. The server 302 can also include a display 308. In some embodiments, the system 300 can include a number of remote devices 304-1, 304-2, . . . , 304-N. The remote devices can, for example, include a program, e.g., a number of computer executable instructions, which is operatively or communicatively linked to the server 302. In one embodiment, the number of remote devices 304-1, 304-2, . . . , 304-N can be operatively linked to the server 302 through a security layer 309-1, or secure data network.

In another embodiment, the number of remote devices 304-1, 304-2, . . . , 304-N, such as personal computers operated by perspective buyers of either the building or individual units, include software to provide security at the number of remote devices 304-1, 304-2, . . . , 304-N. The number of remote devices 304-1, 304-2, . . . , 304-N can be coupled to the server 302 in any wired or wireless manner. The devices can be continuously connected to the server 302 or can access the server 302, such as through the Internet, PSTN, or network such as a LAN, WAN, or the like. For example, the one or more remote devices can be coupled over a local area network (LAN), e.g., an Ethernet network, a wide area network (WAN), the public switched telephone network (PSTN), and/or the Internet, to name a few. By way of example and not by way of limitation, the number of remote devices 304-1, 304-2, . . . , 304-N can communicate with one another and the server 302 using transmission control protocol/Internet protocol (TCP/IP).

The system 300 can further include coupling, as described above, to additional servers 306-1, 306-2, . . . , 306-N maintained by other organizations, or a mainframe computer. In one embodiment, the additional servers 306-1, 306-2, . . . , 306-N or mainframe computers include core databases accessible by the server 302. The server device 302 can be coupled to third party or outside organizations and the additional servers 306-1, 306-2, . . . , 306-N in a direct hardwired fashion, e.g. hybrid fiber-coax connection and/or indirectly in a wireless fashion using remote electromagnetic signal transmission in the radio or microwave frequencies. The additional servers 306-1, 306-2, . . . , 306-N can be operatively linked to the server 302 through a security layer 309-1, or secure data network.

Embodiments of the computer system, such as system 300, can have many forms. For example, the system can be a computer with one or more displays for viewing and in some embodiments interacting with the program. The interaction with the program can be provided through a user interface of any type, such as by a touch screen, a keyboard, a mouse, and the like. This embodiment can for example, be used at a developers office for selling individual units to prospective buyers. The buyers can each use a display to view and in some cases use a user interface to enter selections. The system could have a single display connected to the device 302, could have several displays connected to a device 302 to enable several buyers to use the system at the same time, or several devices each having displays could be used, for example. In one embodiment, the servers and systems include servers and systems maintained by building developers that have invested or are interested in the construction plan on device 302.

Moreover, the embodiments of the invention may be practiced with other computer system configurations, including hand-held devices, multi processor systems, microprocessor-based or programmable consumer electronics, network PCS, minicomputers, mainframe computers, and the like. The invention may also be practiced in distributed computer environments where tasks are performed by remote processing devices that are linked through a communications network. In a distributed computing environment, program modules may be located in both local and remote memory storage devices.

Various embodiments of the present invention, provide a construction layout for a multi-unit residential complex incorporating a grouping of individual residential units about a central open atrium. The central atrium, walkways, and porches in various embodiments of the invention provide living features such as providing an area for neighbors to interact when coming and going from their home or when sitting and enjoying a semi-public or semi-private area within the building. The configuration for a multi-unit residential complex can be created by individual residential units that are arranged in side by side relationship about an atrium, with each of the individual units having access to the atrium via a semi-public space.

The configurational arrangement for a structure can incorporate multiple dwelling units where each individual unit can be in communication with an atrium. In some embodiments, the interface between the living quarters and the atrium can be separated by a windowed wall with a door for controlled ingress/egress.

Embodiments of the present invention provide a structural arrangement for multiple unit dwellings comprising a grouping of individual units enclosing or surrounding an atrium. The individual units surrounding the atrium can be positioned in a side by side relationship along all sides of the atrium, and thereby provide free and open access. The arrangement of dwelling units permits owners or occupants of each unit to enjoy a sense of open and spacious environs.

Various embodiments of the present invention provide an openness which contributes to pleasing visual amenities through commonly owned areas. The conventional forms of ownership may be exercised, including owner/rental or alternatively condominium ownership. Embodiments can have access to upper levels by elevators. The elevators can be located in a common entrance area or in the atrium. Stairwells can also be incorporated into the structure.

The design of the multiple unit dwellings is such that conventional construction, prefabrication, or combinations of these techniques may be utilized. A service area can be included within some embodiments in order to provide ease of access for physically handicapped individuals, and also to facilitate convenient access for arrangements incorporating multi-level structures, typically a two or three-story interior.

As illustrated in FIGS. 4-9, embodiments can provide a community atrium space accessible and adjacent to each of the individual dwelling units, with spaces of semi-public and semi-private nature being provided. Embodiments can include buildings having a number of levels and can include stacked atriums. In stacked atrium embodiments, the bottom of an atrium is formed on a floor and the floor acts as the top of an atrium formed below the floor. The atriums can be naturally lit or artificially lit.

The portions of the units adjacent to the atrium are can be referred to herein as "front porch" zones with entryways fenced for separation and to allow residents to feel the security and domain of their own home. At the same time, these units are visually connected with the outside world so as to preserve whatever privacy may be desired.

A growing number of buyers in the housing market seek options that give them the same or substantially the same lifestyle components as they had enjoyed in individual single-family homes. The presence of the open atrium provides a front yard without exposure to a typical out-of doors environment which may include the presence of insects, reptiles, rodents, and the like.

The design eliminates the typical elongated and utilitarian corridors found in certain multiple unit dwelling structures as well as commercial structures, with such arrangements having been found to detract from social interaction. The semi-private areas provide a space in the form of a semi-public or common area for residents to relax, read, or engage in social activities.

Multiple unit structures developed/constructed in accordance with the present invention provide an effective redevelopment tool for downtown or urban areas. While units are typically arranged in two or three levels, additional levels or stories may be utilized where development and/or demographics dictate such a need. The open atrium features are, of course, adapted for utilization within such multi-story arrangements.

The top of the atrium can be open to the environment. However, in areas where harsh weather conditions exist, a retractable and/or permanent cover can be provided. The cover may be transparent or opaque to create a closure which is hemispherical, or alternatively semi-circular or accurately configured, and capable of being expanded from a normal retractable disposition to a closed disposition.

In some embodiments of the present inventions, an open top atrium may be screened for protection from flying insects. Such screening may become unnecessary in multi-level structures where the opening is at a level exceeding that normally occupied by flying insects.

In other embodiments, the atrium may be naturally lit at only the uppermost level or levels of the residential structure, while lower levels are artificially lit. An important aspect of the invention is an "exterior" effect" provided by the atrium, and this effect can be accomplished whether or not the atrium is open, either visually, physically, or both, to the exterior of the structure.

Figure 4:
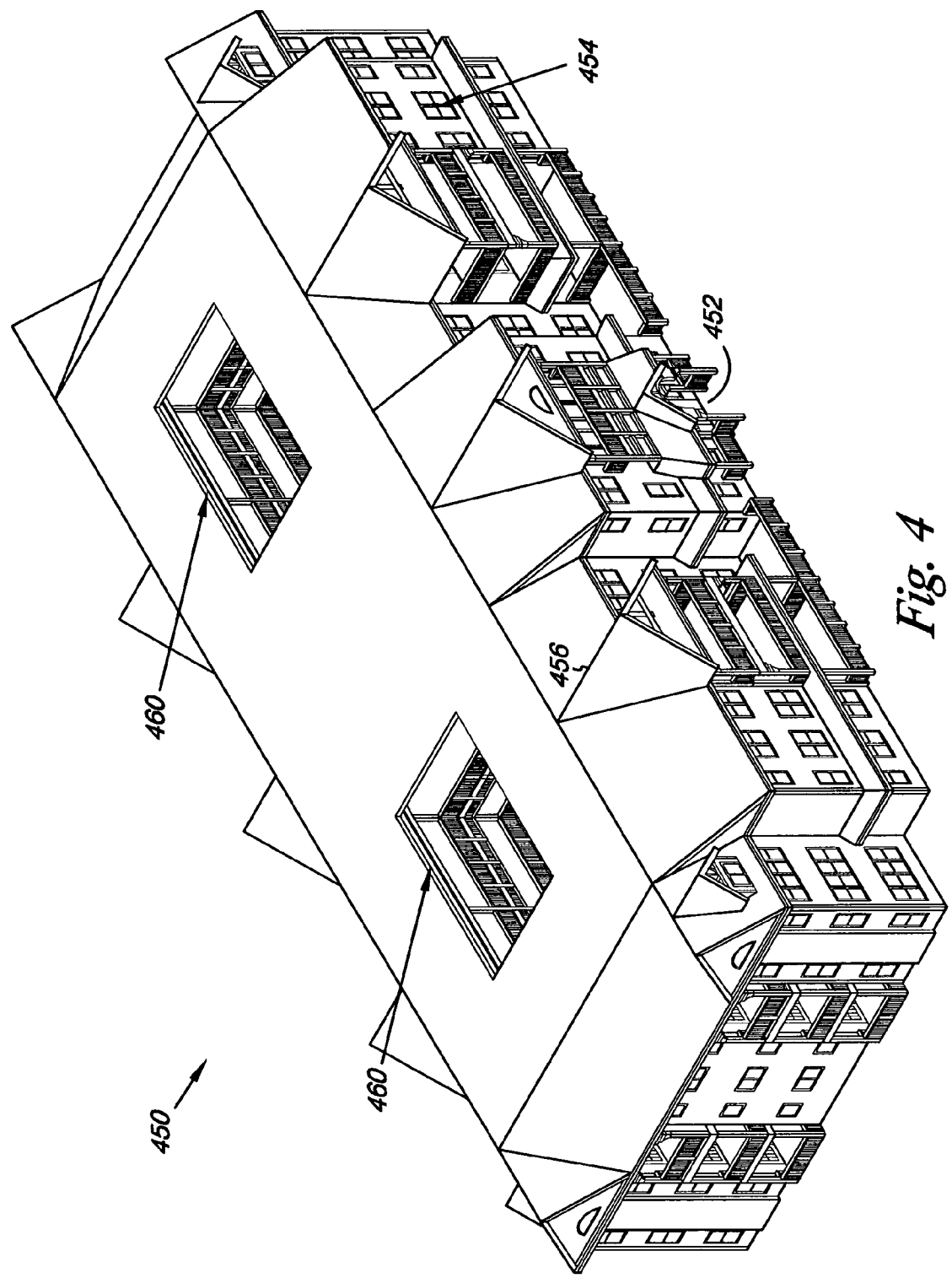
FIG. 4 illustrates an angled front elevation of a multi-unit building embodiment.

FIG. 4 illustrates a building 450 having a main entrance 452 and a number of individual living units 454. The main entrance 452 allows for access to one or more atriums 460 within the building 450 and, from the atriums 460, access to the primary entrances of the units as are shown in detail in FIGS. 5 and 6. The main entrance 452 can be used as the access point into all units through the atrium 460 thereby creating areas that are frequented by all unit owners and therefore promote interaction between the owners of the building units. In the example shown, two atriums 460 are provided and are connected to the main entrance 452. The interior components of the building 450 are shown and described in detail with respect to FIGS. 5-9. The embodiment of FIG. 4 can be used in the marketing of the building and can be part of a marketing system such as is shown in FIG. 1.

Figure 5:
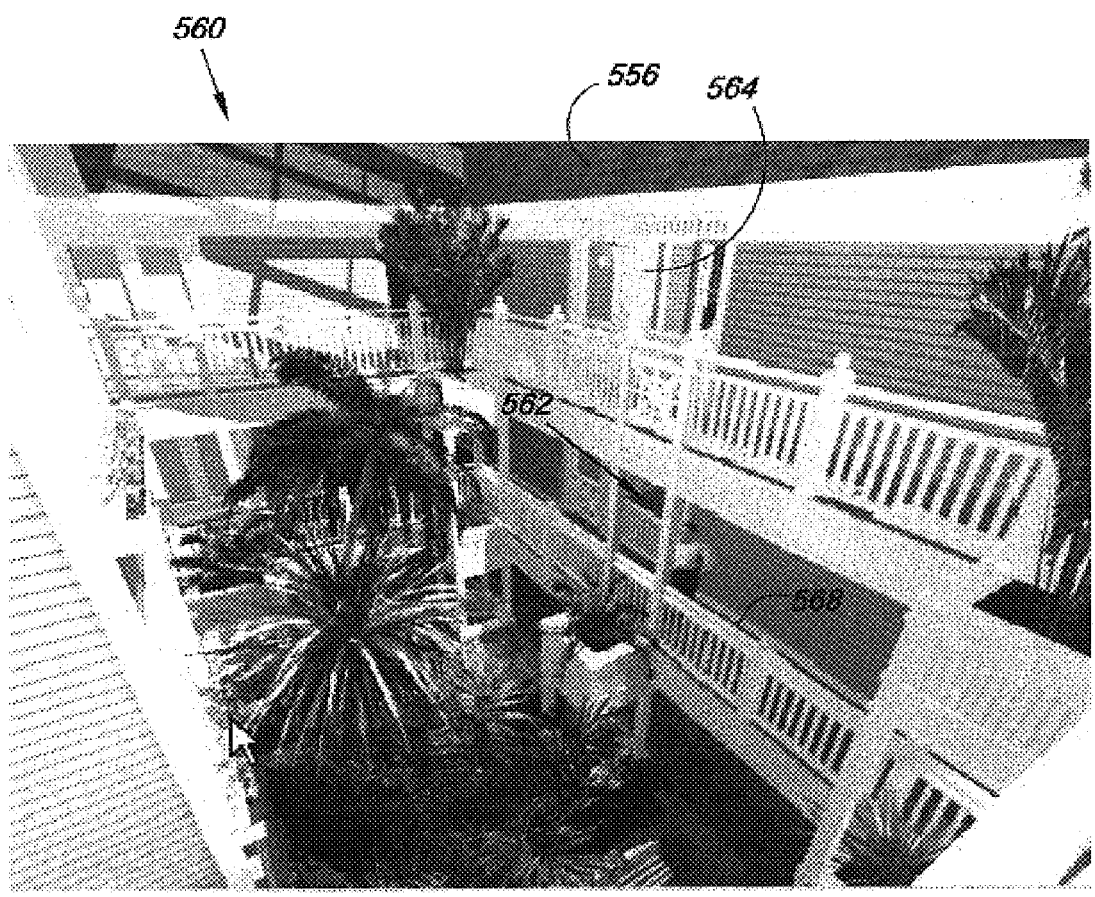
FIG. 5 illustrates an interior view of a multi-level, multi-unit building having a progression from public to semi-public to semi-private to private spaces.

FIG. 5 illustrates an interior view of a multi-level, multi-unit building having a progression from public to semi-public to semi-private to private spaces. As shown in FIG. 5, each private living unit preferably has a distinct access point 564 to and from the interior atrium 560, and additionally is provided with individual, semi-private living spaces 562. The semi-private living spaces 562 can be nearby or adjacent to the private units. The semi-private living spaces 562 can also be positioned between the open atrium 560 and the access point 564 of an individual residential unit. Such living spaces include, for example, porches, decks, and other traditionally "outdoor" spaces in proximity to residential units. Such a configuration provides a unique access space to a shared open area embodied by the open atrium 560 of the embodiments of the invention.

The atrium can also provide common/semi-public areas 568 where people that access the building can utilize. These semi-public areas 568 can include walkways and other open spaces for residents and their guests to gather. These areas can also include benches, chairs, and tables that can be positioned along or in the semi-public areas.

Figure 6:
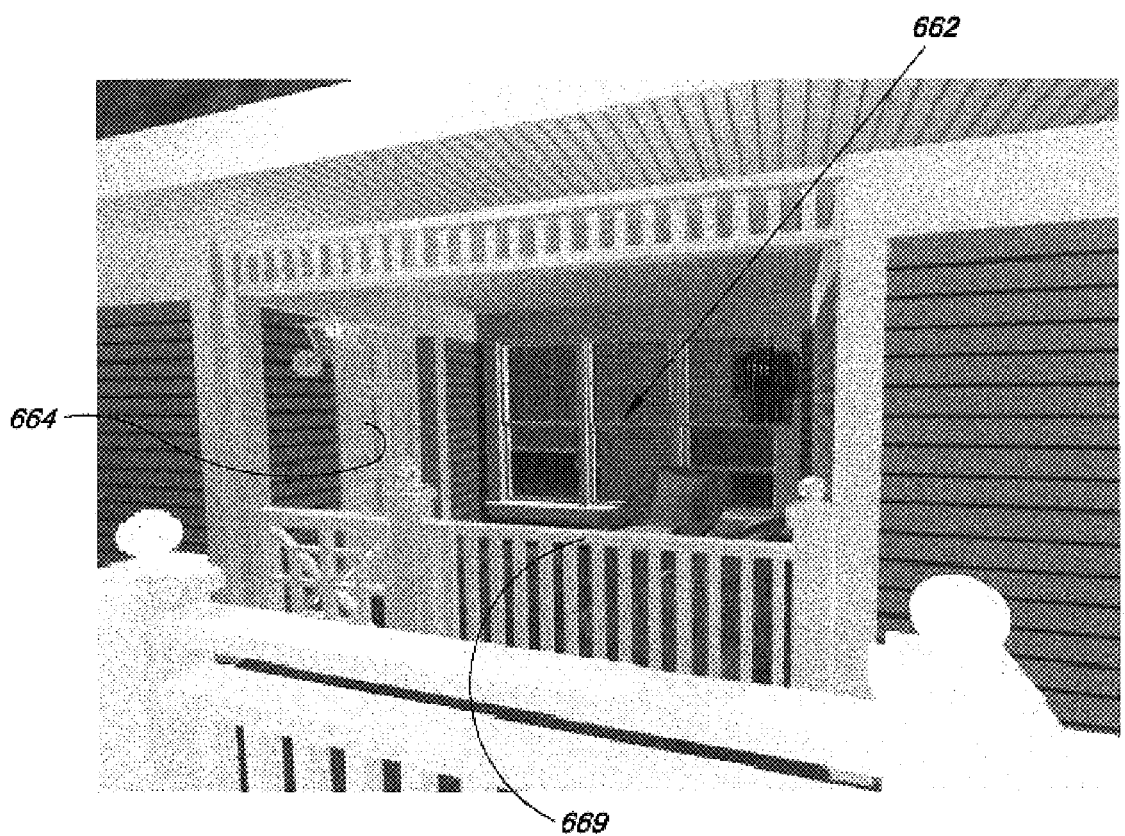
FIG. 6 illustrates a view of a semi-private area within the interior of a multilevel, multi-unit building.

FIG. 6 illustrates a view of a semi-private area within the interior of a multilevel, multi-unit building. In the embodiment shown in FIG. 6, semi-private living space 662 is adjacent the access point 664 of a private unit. The semi-private living space 662 can be separated from the semi-public space of the atrium by, for example, a half fence 669. In this way, the people in the semi-private living space 662 can, for example, have a place to sit and enjoy the atrium area that can be associated with their unit. The semi-private living space 662 also allows for the owner to socialize with other owners and guests without having the other owners and guest enter their private unit.

Figure 7:
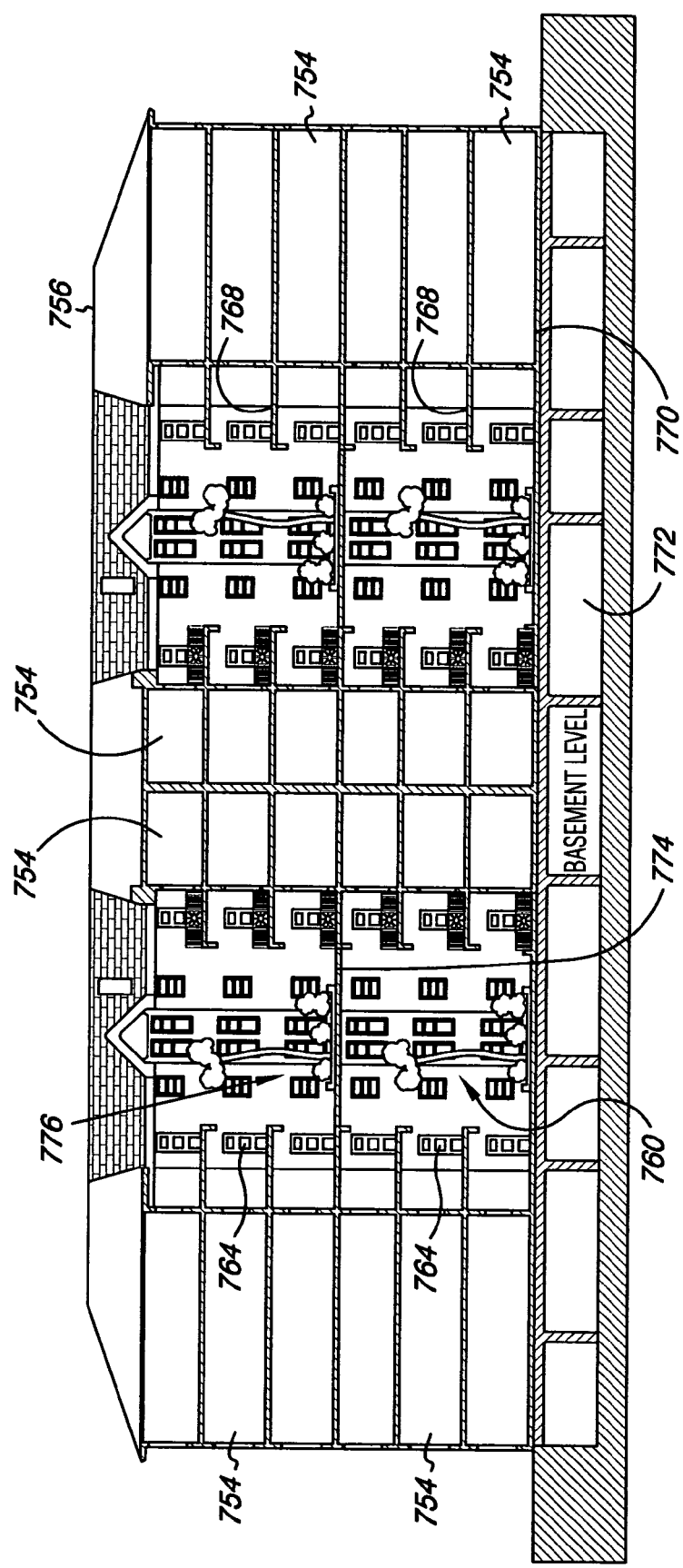
FIG. 7 illustrates a sectional elevation drawing of a building embodiment.

The embodiment of FIG. 7 illustrates a sectional view of a building embodiment. The building shown in FIG. 7 illustrates an embodiment having two atriums 760 and a basement 772. The building embodiment of FIG. 7 can include a concrete foundation 770 that forms the floor of the individual units 754 on the first floor of the building and the floor of the atriums 760. In multi-level embodiments, the building can have a number of stacked atriums. In the embodiment shown in FIG. 7, a floor 774 forming the bottom of one atrium 776 can act as an upper boundary for one atrium 760 and a lower boundary for another atrium 776. The roof 756 is shown having tapered sides to encourage the runoff of rain and snow that can accumulate on the roof 756. The basement level 772 can be any size and can be used for a variety of purposes. For example, the basement level 772 can include; private areas for use by the building owner for electrical, mechanical, and trash handling; private areas such as private storage for unit owners; and semi-public areas such as a parking area, bicycle storage, exercise room, restrooms/locker rooms, and a lobby area, among others. Embodiments of the invention can include a number of above ground levels and a number of below ground levels.

In the embodiment shown in FIG. 7, the building has multiple levels with an atrium extending upward from the first floor. In this embodiment, each level has a number of walkways 768 to provide access to the access points 764 of the private individual units on that level. As described with respect to the interior atrium shown in FIG. 5, each level can include semi-public and semi-private areas thereon.

Figure 8:
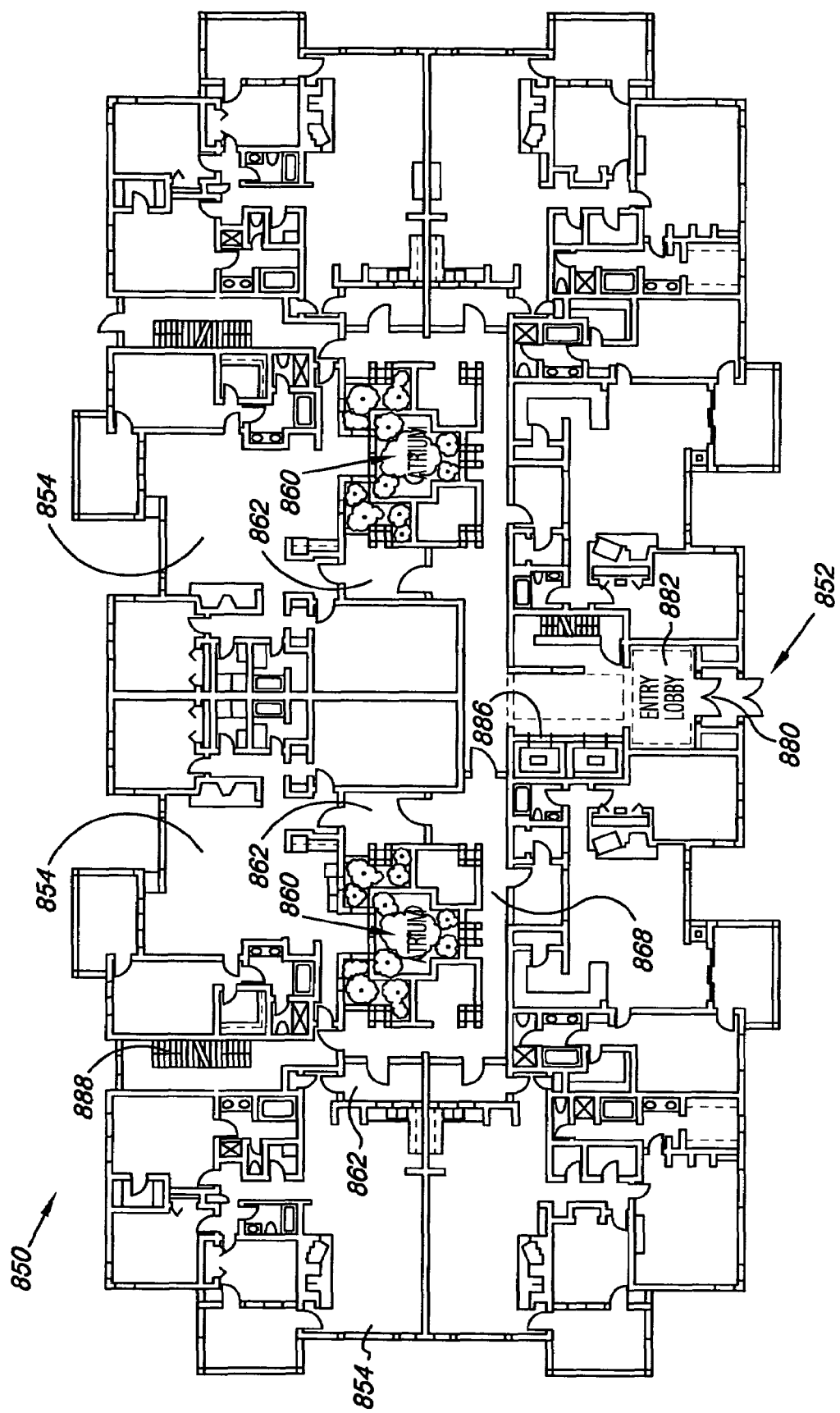
FIG. 8 illustrates a floor plan embodiment of a building having a progression from public to semi-public to semi-private to private spaces.

FIG. 8 illustrates a floor plan embodiment of a building having a progression from public to semi-public to semi-private to private spaces, such as that shown in FIGS. 4-7. In FIG. 8, the building 850 includes a main entrance 852. The main entrance can be designed to open into a public entry area 880 for general access by the public. The building 850 can also include a semi-public entry lobby 882 and can include a number of elevators 886.

The building 850 also includes a number of atriums 860. The atriums can be in any size and shape and can include any of a variety of features. Atriums can be designed for general use by all unit owners and their guests or can be designed for different types of unit owners, such as families with growing children, mature adults, and the physically challenged, among others. For example, the atriums; can provide a natural setting having a number of plants therein; can have common meeting areas that can include seating for a number of people therein; can include play equipment for children, such as swing-sets, slides, pools, and the like; and/or can include entertainment equipment such as tennis courts, walking paths, and the like; among other items. The building 850 can also include a number of stairways 888, and a number of semi-public areas 868 having access to a number of semi-private areas 862 and to the individual units 854.

The building 850 can be designed to provide a graduated level of security from the outside of the building 850 to the inside. In particular, the main entrance 852 of a building 850, can be a public area and can be accessed by unit owners and non-owners. A secured access entrance 880 can be provided between the main entrance 852 and the entry lobby 882. A secured access entrance 880 can be provided by a coded entry system where a code has to be entered in order for the entrance to be opened, or by a key, such as a mechanical or coded key can be used to grant access through the entrance, among other entry systems. If a secured access entrance 880 is provided between the main entrance 880 and the entry lobby 882, the entry lobby 882, atrium 860, and walkways 868 within the atrium 860, can be considered a semi-public areas since only those passing through the secured entrance 880 can enter the areas 882 and 860.

Figure 9:
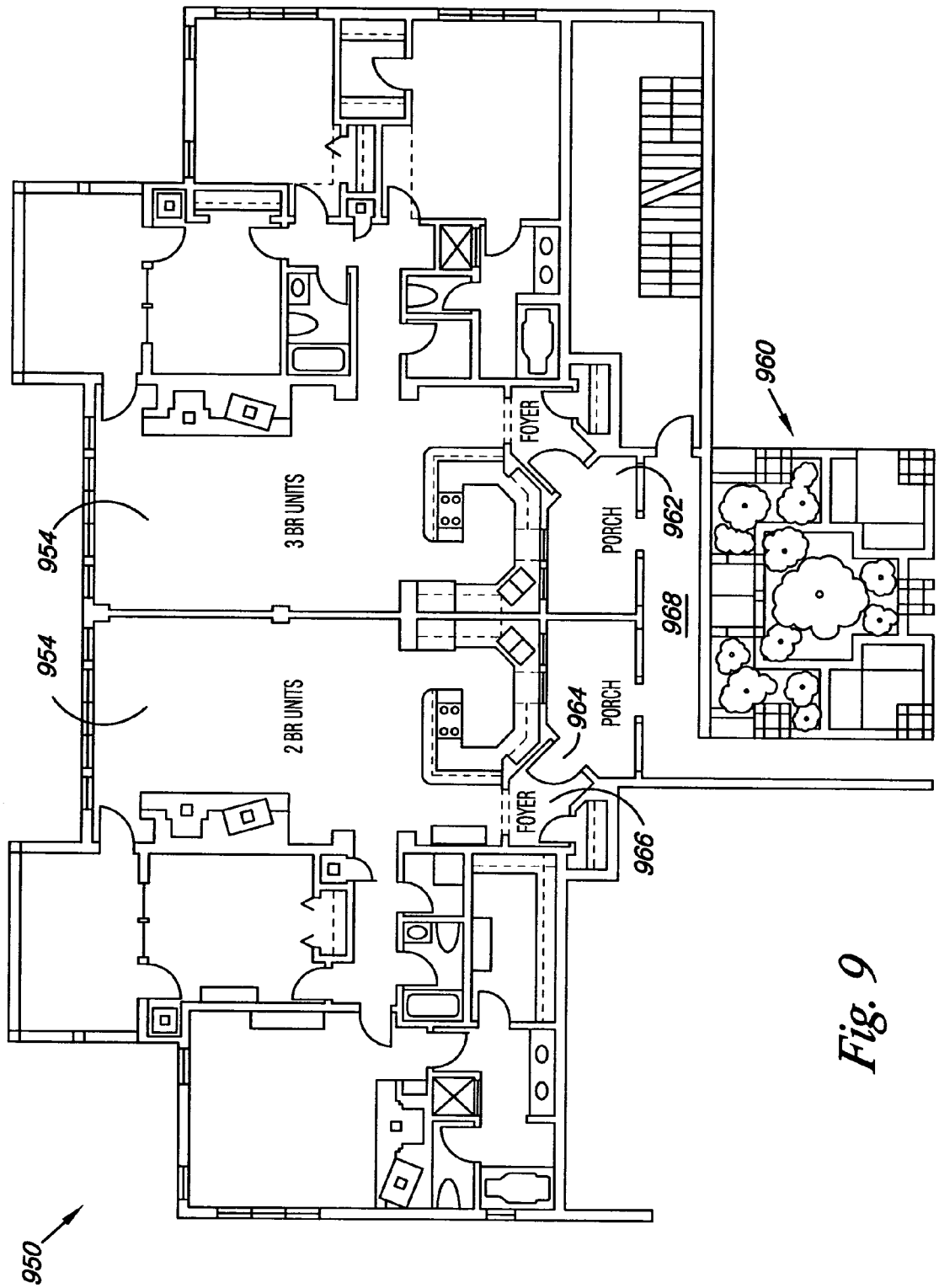
FIG. 9 illustrates a floor plan embodiment of two unit types of a multi-unit building.

FIG. 9 illustrates a floor plan embodiment of two unit types of a multi-unit building. In FIG. 9, a two bedroom unit and a three bedroom unit configuration (both 954) are shown. A number of units within the building 950 can include semi-private areas 962. In this embodiment, both units 954 include a semi-private area 962. The semi-private areas 962 are each linked to a particular unit, for example, by the area's 962 proximity to a unit 954. In the case shown in FIG. 9, the semi-private areas 962 are adjacent to a particular unit 954. In some embodiments, the semi-private areas 962 can be proximate to a unit 954, but not adjacent thereto. For example, the semi-private area 962 could be positioned across the walkway 968 from a unit 954.

In the embodiment shown in FIG. 9, the semi-private areas 962 provide a porch-like atmosphere that allows a user to socialize with neighbors and visitors to the building without granting access to their individual unit 954. This feature provides security to the unit owner and allows for neighborly interaction between neighbors and visitors within the semi-private area 962. In this embodiment, the semi-private areas 962 are defined by semi-private structures, such as short fences or shrubs, such that people on the walkway 968 can see and interact with people in the semi-private areas 962. This also allows for neighborly interaction between people in the semi-private areas 962 and people on the walkways 968 or in the atrium area 960.

In the example shown in FIG. 9, the semi-private areas 962 are positioned between the walkway 968 of the atrium 960 and the primary entrance 964 of the unit 954. In some embodiments, the primary entrance is attached to the foyer 966 of the unit 954.

These embodiments can provide a graduated increase in privacy as the user of visitor approaches the unit. For example, as stated with respect to FIG. 7, the atrium 960 and walkway 968 therein can be considered semi-public areas. Since each area 962 is associated with a particular unit, the areas 962 can be considered semi-private areas. And, the units 954 are provided with a secured entry 964 that can be accessed by a particular code or key that is associated with that particular unit, e.g. a house key in possession of the unit owner. Accordingly, the units 954 are considered private areas since they can only be accessed by those with the code or key for the particular unit.

Although specific embodiments have been illustrated and described herein, those of ordinary skill in the art will appreciate that an arrangement calculated to achieve the same techniques can be substituted for the specific embodiments shown. As one of ordinary skill in the art will appreciate upon reading this disclosure, various embodiments of the invention can be performed in one or more devices, device types, and system environments including networked environments.

Combination of the above embodiments, and other embodiments not specifically described herein will be apparent to those of skill in the art upon reviewing the above description. The scope of the various embodiments of the invention includes other applications in which the above structures and methods can be used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A multiple unit building, comprising;
a concrete foundation;
a number of residential units constructed above the concrete foundation, wherein at least some of the number of units are positioned bordering at least a portion of a first atrium on a first level having at least a public portion formed above the concrete foundation, each unit including a semi-public area adjacent to an entrance into the unit and adjacent to the first atrium;
the public portion having a common area for ingress and egress from outside the building connected to the first atrium;
a number of levels including:
a basement located below the first atrium;
the first level having a floor forming a lower boundary of the first atrium thereon and a first number of units bordering the first atrium;
a second level having a second number of units bordering the first atrium;
a third level having a floor and a first number of units bordering a second atrium; and
a fourth level having a second number of units bordering the second atrium, thereby defining multiple atriums positioned one above another.

2. The multiple unit building of claim 1, wherein the concrete foundation forms the floor of the first level and the first atrium extends upward through a number of levels from the floor of the first level.

3. A multiple unit building, comprising;
a common entryway leading to one of a number of atriums, the atrium bordered by a number of private residential units in which residents reside, for ingress and egress of residents to and from their units, the atrium having a public area formed therein;
the number of units each having a semi-public area formed from at least a portion of the atrium and wherein each said semi-public area is adjacent to the public area, the number of units each having a front entrance to the unit facing to the atrium;
wherein the building includes a number of levels stacked one above another, each level includes a number of units bordering at least a portion of said one of a number of atriums, and wherein each atrium includes multiple levels, the number of units bordering each said atrium having an entrance to the unit facing the atrium, and wherein a number of levels have a floor that acts as an upper boundary for one atrium and a lower boundary for another atrium, thereby defining multiple atriums positioned one above another.

4. The multiple unit building of claim 3, wherein each unit has a foyer adjacent to the front entrance.

5. The multiple unit building of claim 3, wherein the entryway is connected to a number of different atriums each having a number of units bordering the atrium.

6. The multiple unit building of claim 5, wherein a number of units are arranged back to back such that the back of one unit faces one atrium and the back of the other unit faces the other atrium.

7. The multiple unit building of claim 3, wherein each unit includes a semi-private area proximate to the unit and wherein the semi-private area is positioned between the unit and the semi-public area.

8. The multiple unit building of claim 7, wherein each said semi-private area is associated with and proximate to a particular unit and front door into the particular unit.

9. The multiple unit building of claim 8, wherein each said front door is positioned for entry of an individual into the unit via the unit's associated and proximate semi-private area.

10. The multiple unit building of claim 7, wherein each semi-private area is adjacent to a particular unit.

11. The multiple unit building of claim 3, wherein access from the public area to each of the units is accomplished by passing through one of the semi-public areas and through the front entrance of the unit.

12. The multiple unit building of claim 3, wherein the building has a number of levels including a basement located below the atrium.

13. The multiple unit building of claim 12, wherein the basement includes a number of parking spaces for parking automobiles.

14. A multiple unit building, comprising;
a concrete foundation;
a number of residential units constructed above the concrete foundation, the number of units bordering at least a portion of a first atrium on a first level having at least a public portion formed above the concrete foundation, each unit including a semi-public area adjacent to an entrance into the unit and adjacent to the first atrium;
a common area for ingress and egress from outside the building connected to the first atrium; and
a number of levels including:
the first level having a floor forming a lower boundary of the first atrium thereon and a first number of units bordering the first atrium;
a second level having a second number of units bordering the first atrium; and
a third level having a floor and a third number of units bordering a second atrium, wherein the floor of the third level acts as an upper boundary for the first atrium and a lower boundary for the second atrium; and
wherein the concrete foundation is on a first level and the atrium extends upward through a number of levels.

15. The multiple unit building of claim 14, wherein the common area has an elevator therein for accessing the first atrium from a common entryway located on another of the number of levels of the building.

16. The multiple unit building of claim 14, wherein the second level includes a public area within the first atrium for ingress and egress of residents to the second number of units, a number of semi-private areas wherein each semi-private area is adjacent to a portion of the public area and associated with and proximate to a particular unit of the second number of units and a primary entry door into the particular unit that is positioned for entry of an individual into the unit from one of the atriums.

17. The multiple unit building of claim 14, wherein the first level is not adjacent to the second level.

18. The multiple unit building of claim 14, wherein the second level is not adjacent to the third level.

* * * * *